United States Patent [19]

Ohki

[11] Patent Number: 4,791,285

[45] Date of Patent: Dec. 13, 1988

[54] READ/WRITE METHOD BY A NON-CONTACT SYSTEM AND BETWEEN A STORAGE SUBSTRATE AND READ/WRITE UNIT

[75] Inventor: Shinji Ohki, Osaka, Japan

[73] Assignees: Koatsu Gas Kogyo Co., Ltd., Osaka; Nippon LSI Card Co., Ltd., Higashiosaka, both of Japan

[21] Appl. No.: 158,075

[22] Filed: Feb. 12, 1988

Related U.S. Application Data

[63] Continuation of Ser. No. 753,474, Jul. 10, 1985, abandoned.

[51] Int. Cl.⁴ .............................................. G06K 7/08
[52] U.S. Cl. ................................... 235/449; 235/436; 235/492; 235/493
[58] Field of Search .............. 235/441, 449, 492, 493, 235/436

[56] References Cited

U.S. PATENT DOCUMENTS

| | | | |
|---|---|---|---|
| 4,007,355 | 2/1977 | Moreno | 235/492 X |
| 4,029,945 | 6/1977 | Yamada et al. | 235/492 X |
| 4,277,837 | 7/1981 | Stuckert | 235/380 X |
| 4,408,119 | 10/1983 | Decavele | 235/380 X |
| 4,473,825 | 9/1984 | Walton | 235/380 X |
| 4,605,844 | 8/1986 | Haggan | 235/492 X |
| 4,661,691 | 4/1987 | Halpern | 235/449 X |

Primary Examiner—David L. Trafton
Attorney, Agent, or Firm—Armstrong, Nikaido, Marmelstein & Kubovcik

[57] ABSTRACT

A read/write method using a non-contact system and used between a storage substrate and a read/write unit, the method including a storage substrate providing a memory at a card or other substrates, and a read/write unit, the storage substrate providing a coil for power supply, a coil for receiving data to be recorded in a memory, a coil for outputting toward the read/write unit the data recorded in the memory, and a coil for receiving a mode command, the read/write unit providing coils corresponding to four coils at the storage substrate, so that the respective corresponding coils at the storage substrate are insertably positioned in the magnetic flux generated by each coil at the read/write unit, whereby the read/write unit writes data in the memory at the storage substrate, or the data stored in the memory at the storage substrate is read by the read/write unit.

4 Claims, 7 Drawing Sheets

READ/WRITE METHOD BY A NON-CONTACT SYSTEM AND BETWEEN A STORAGE SUBSTRATE AND READ/WRITE UNIT

This application is a continuation of application Ser. No. 753,474 filed July 10, 1985 now abandoned.

BACKGROUND OF THE INVENTION

1. Field of the Invention

This invention relates to a method for writing and reading by a non-contact system digital signals from a computer onto a memory provided at a storage substrate of cards or other substrates.

2. Description of the Prior Art

Recently, cards containing therein semiconductor integrated circuits, the so-called IC cards or LSI cards, have been used instead of magnetic cards widely used in, for example, banks or the like. For transmitting or receiving data and various information between the IC or LSI cards and a read/write unit, a contact system is usually used.

Such system, however, exposes terminals on the surface of the card, so that dust adheres to the terminal, or the terminal is damaged by contact with a foreign object, thereby causing poor contact at the terminal. Or, there is a defect that the terminal picks up static electricity to cause a fault.

In other words, the soiled or damaged terminal cannot reliably transmit the signals and so presents the danger of hindering the IC cards from normal operation or of causing an error during the transmitting data. Furthermore, impuries attach to the terminal to result in a short circuit between the terminals, whereby proper data transmission may be impossible.

However, regarding a power source, a solar cell using method exemplary of the non-contact system has been proposed and put into practical use.

For the solar cell, it is certain that electric power to be consumed in the IC card is obtainable by the non-contact system, but it is difficult for the present technique to transmit or receive, by non-contact between the IC cards and the read/write unit, the clock and data signals necessary to normally operate electronic circuits at the IC card.

SUMMARY OF THE INVENTION

In the light of the above problem, this invention has been designed. An object of the invention is to provide a method for supplying the power to a storage substrate called the IC card and for writing and reading the recording signals by a non-contact system but not by a conventional contact system, thereby eliminating the above-mentioned defects.

In order to attain the object of the invention, a read/write method by the non-contact system and used between a storage substrate and a read/write unit, has been designed. This invention is characterized in that the read/write method includes a storage substrate and a read/write unit for recording on the storage substrate digital signals from a computer and reading the recorded signals from the storage substrate, the storage substrate being provided with a coil for receiving the circuit-driving power supply, a coil for receiving digital signals to be written in a memory, a coil for outputting the stored contents from the memory to the read/write unit, and a coil for receiving a mode command in the memory, the read/write unit being provided with four coils corresponding to the four coils at the storage substrate, so that the respective corresponding coils at the storage substrate are insertably positioned in the magnetic flux generated at each coil on the unit, whereby the power is supplied to the circuits on the storage substrate and the stored contents, i.e., digital signals, are written from the unit into the storage substrate, or the stored contents written in the storage substrate are read by the unit.

The above and further objects and novel features of the invention will more fully appear from the following detailed description in accordance with the accompanying drawings.

DESCRIPTION OF THE PREFERRED EMBODIMENT

Figure 1:
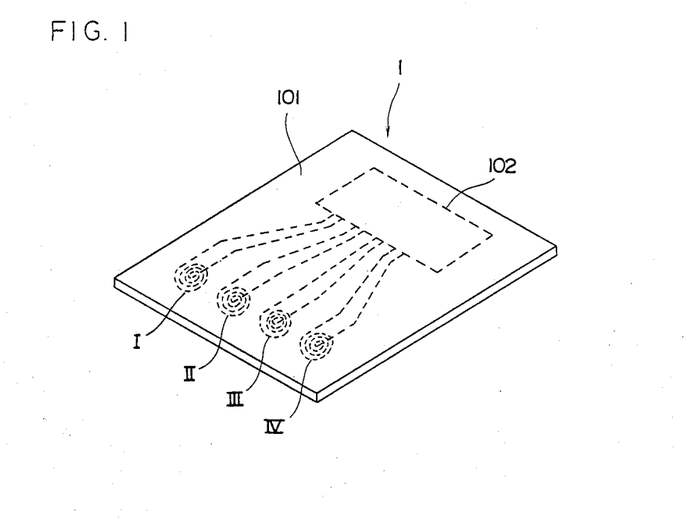
FIG. 1 is a perspective schematic view of an IC card of the invention.

Referring to FIG. 1, an IC card/comprises a substrate 101 formed of synthetic resin or other insulating materials, an electronic circuit 102 embedded in the substrate 101, and coils I, II, III and IV.

Figure 4:
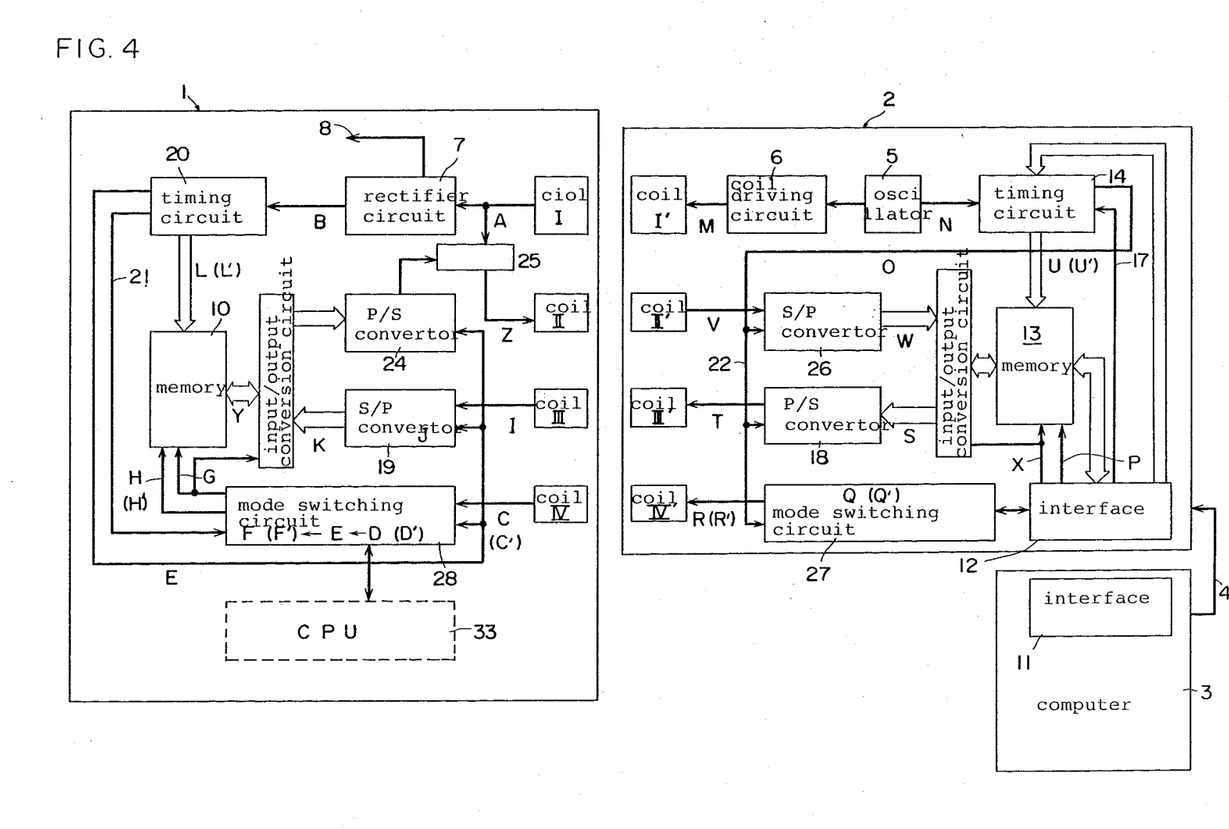
FIG. 4 is a block diagram of electric circuits of the IC card and a read/write unit.
Figure 5A:
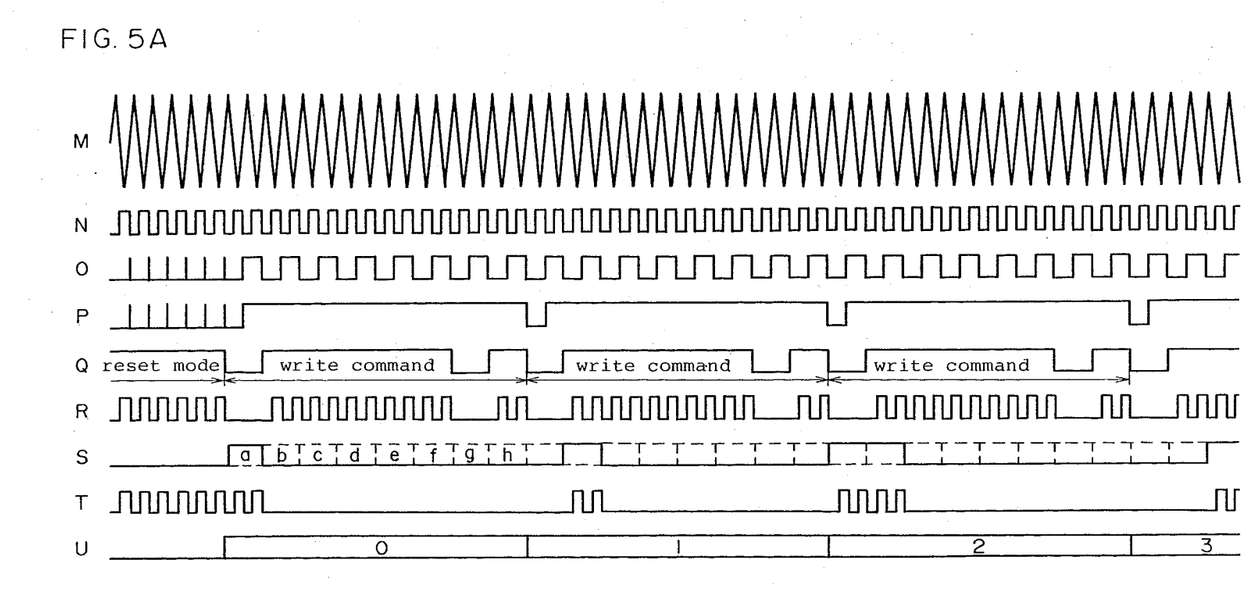
FIGS. 5A and 5B are time chart showing wave forms of signals when written from the read/write unit into the IC card.
Figure 5B:
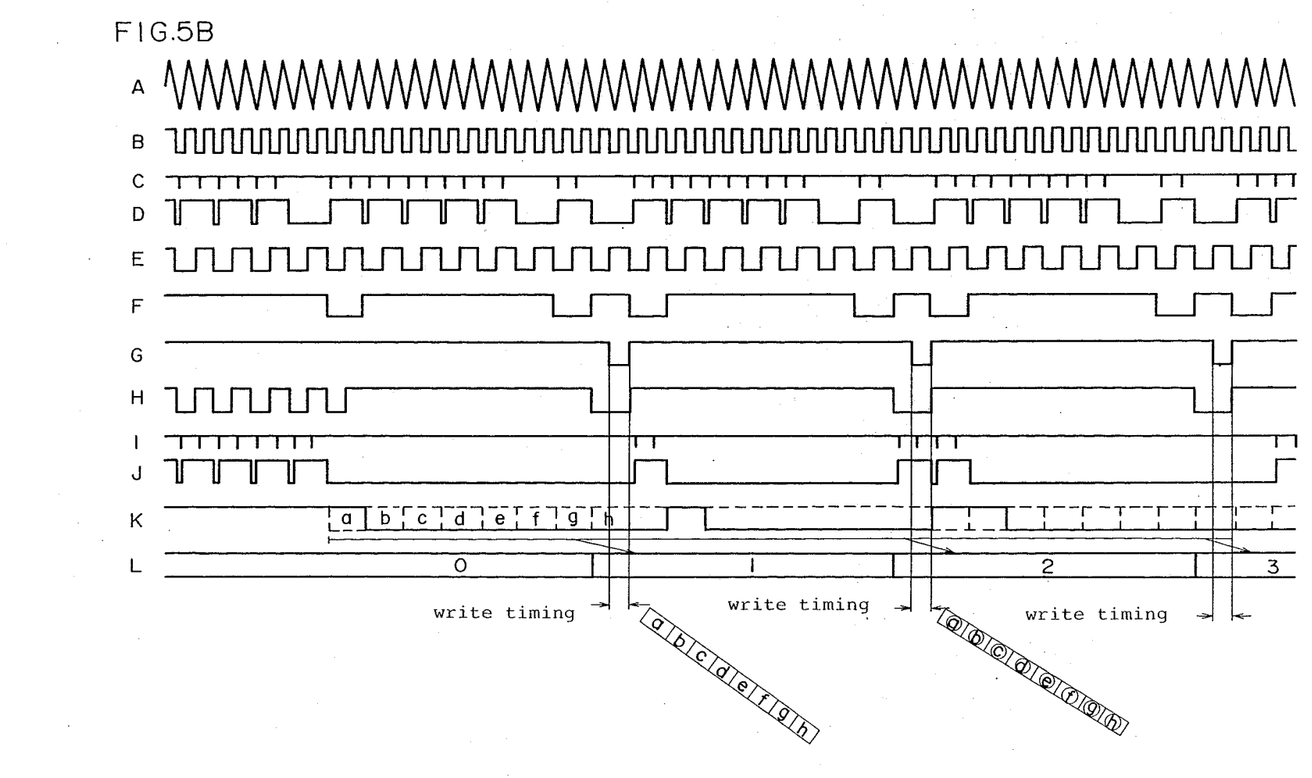
Figure 6A:
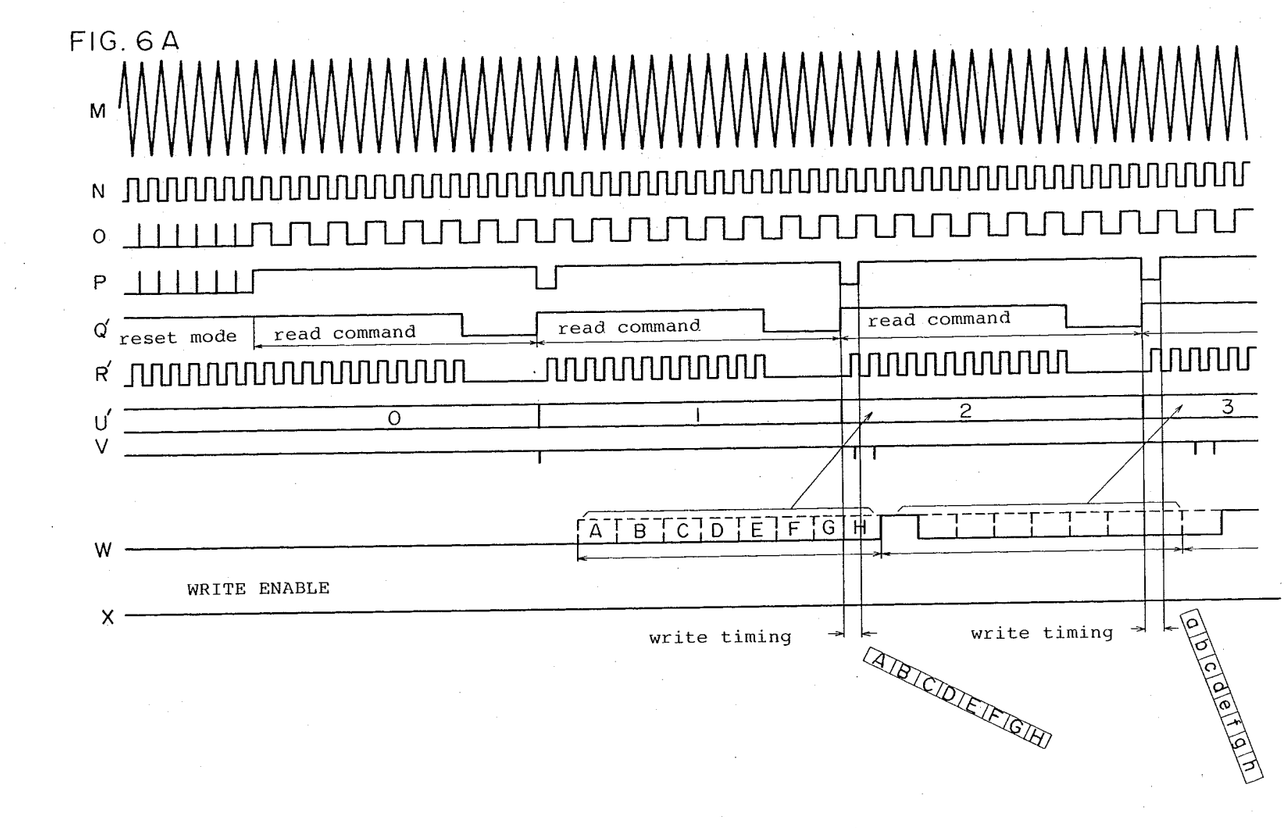
FIGS. 6A and 6B are a time chart showing wave forms of signals when read by the read/write unit from the IC card.
Figure 6B:
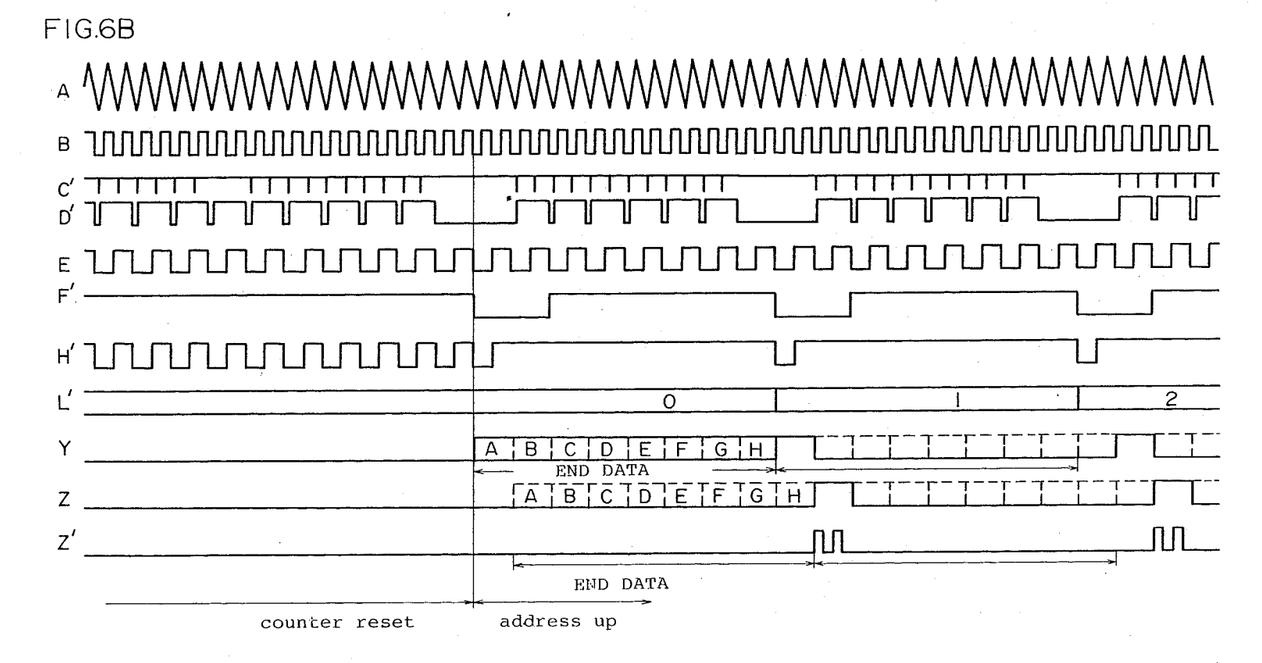

The coil I serves as a power supply coil to receive from a read/write unit shown in FIG. 4 the power for driving the electronic circuit 102.

The coil II serves as a data outputting coil for transmitting to the read/write unit the stored contents written in a memory in the electronic circuit 102.

The coil III serves as a data input coil for receiving from the read/write unit digital signals to be stored in the memory.

Figure 2:
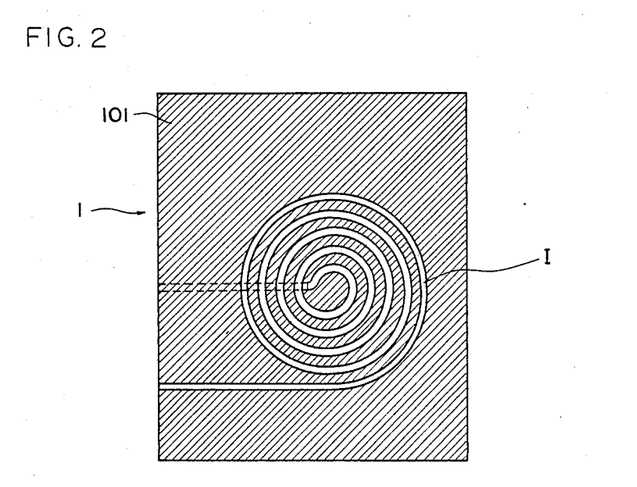
FIG. 2 is an enlarged plan view of a coiled portion at the IC card in FIG. 1.

The coil IV serves as a coil through which the memory receives a mode command from the read/write unit, which is called the mode setting coil. Each coil, as shown in FIGS. 1 and 2, is made spiral and provided in the vicinity of the edge of the IC card.

Such coil group can be formed by a well-known means of etching a copper foil coated by, for example, sticking or plating onto the insulating substrate 101.

Another method is to form the coils by winding a metal wire spirally.

The read/write unit 2 carrying out write/read with respect to the IC card is provided with four coils I', II', III' and IV' corresponding to the aforesaid coils I, II, III and IV respectively.

Next, explanation will be given on a concrete construction of the coil I'. The coil I', as shown in FIG. 3, is preferred to be embedded in a coil holder 201 formed of an insulating material, such as synthetic resin, and of a U-like shape in section.

In detail, the coil holder 201 is provided with an upper plate 201a having a terminal 201d, a lower plate 201b having a terminal 201e, and a vertical plate 201f connecting the upper plate 201a and lower plate 201b, the coil I at the IC card I being adapted to be inserted between the upper plate 201a and the lower plate 201b.

The coil I' comprises a coil I'a embedded into the upper plate 201a and a coil I'b embedded into the lower plate 201b, both the coils I'a and I'b being connected to enable generation of the magnetic flux in the same directions. In the drawing, the coils I'a and I'b are connected in series, the coil I'a connecting at one end with the terminal 201d, the coil I'b connecting at one end with the terminal 201e.

Figure 3:
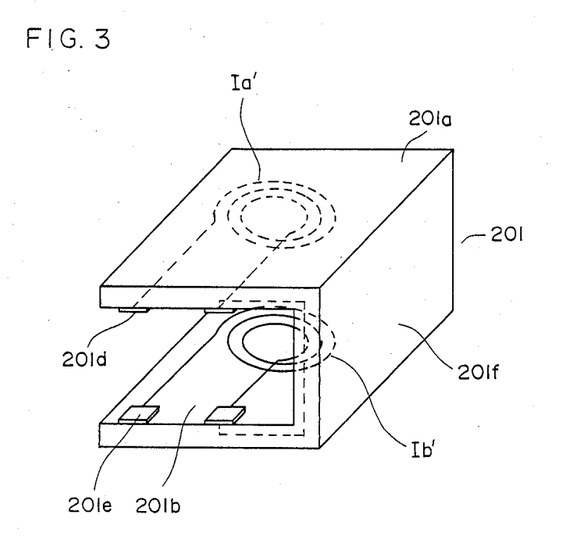
FIG. 3 is a perspective schematic view of a coil holder.

Also, other coils I', II', III' and IV' are the same in construction as that I', where FIG. 3 depicts a sole coil holder 201. This coil holder is made further layer in length so that the coils I', II', III' and IV' can be provided in continuation on the longer coil holder.

The coil I', which comprises two coil portions I'a and I'b as above-mentioned, may be of only coil Ia or Ib when the coil I' can generate the desired magnetic flux. In such case, a gap 201c is not necessary. In other words, when the upper plate 201a embedding therein the coil I'a or the lower plate 201b embedded therein the coil I'b is provided, it is apparent to transfer the electromagnetic energy.

As seen from the above, the coil I' is a power supply coil for supplying power to the IC card, the coil II' serving as a read coil for reading the stored contents.

The coil III' serves as a write coil for writing data into the memory at the IC card.

The coil IV' serves as a mode setting coil for giving data to the memory at the IC card.

Next, explanation will be given on concrete operation of the IC card 1 and read/write unit 2 in accordance with FIGS. 4, 5A, 5B, 6A and 6B.

It is assumed that the coils I, II, III and IV at the IC card shown at the left hand in FIG. 4 engage electromagnetically with the coils I', II', III' and IV' at the read/write unit 2 shown at the right hand respectively.

In addition, in order to generate the AC magnetic flux at the coil II, an electric power of the series data is weak when the series data is connected directly merely to the coil II. Hence, part of AC power supply from the coil I is bypassed and received by a chopper circuit 25 so as to be connected to the coil II. In other words, the actuating AC power supply to the coil II, which is the component of coil I, is turned on/off by the chopper circuit 25 to thereby generate at the coil II the magnetic flux corresponding to the data of the memory 10.

Now, in a case where the data from the read/write unit is written in the IC card, an oscillation circuit 5 in the read/write unit 2 is supplied with the power through a wire 4 from a computer 3 which includes an interface 11, and oscillates at the AC frequency of 1 MHz when supplied with DC power, the oscillation power being amplified up to a desired power M by a power supply coil driving circuit 6 and thereafter sent to the coil I'.

A clock signal N output from the oscillation circuit 5 is transmitted to a timing circuit 14 and other circuits requiring the clock signal at the read/write unit 2. An interface 12 sends readout signals P to a memory 13, the timing circuit 14 sending address U to the memory 13. As a result, the memory 13 sends to a parallel/serial conversion circuit 18 data S of 8 bit of a, b, c . . . h through an input/output switching circuit. On the other hand, the timing circuit 14 sends a shift clock signal O to the parallel/serial conversion circuit 18 and a mode switching circuit 27 including therein a parallel/serial conversion circuit.

The parallel/serial conversion circuit 18 converts on the basis of the command of shift clock signal the sent parallel data S into series and then sends T to the coil III'. The mode switching circuit 27 switches the reset mode to the write command mode (waveform Q) on the basis of the shift clock signal sent from the timing circuit 14, thereby transmitting a signal R toward the coil IV.

The coil I (power supply coil at the IC card 1 side) is given power A from the coil I' and sends it to a rectifier circuit 7 which provides power to the IC through wire 8, and a timing circuit 20 receives a clock signal B therefrom and sends a shift clock signal E to a serial/parallel conversion circuit 19, a CPU 33 and a mode switching circuit 28 including therein a parallel/serial conversion circuit 28.

On the other hand, the mode switching circuit 28 receives a mode signal C from the coil IV and latches the signal C within the circuit and converts it into signal D.

In the mode switching circuit 28, the signal D is converted into a signal E, the signal E further is converted into a signal F, and lastly, a memory write command G and a memory read command H are sent to the memory 10. When the memory write command G and memory read command H are at the low level, the data is adapted to be written into the memory 10.

While, the series data I given into the coil III is converted into signal J in a serial/parallel conversion circuit 19 and thereafter output as parallel data K so as to be written in the memory 10 through an input/output switching circuit. In this case, the parallel data K is written in an address L assigned by the timing circuit 20.

As above-mentioned, when the commands G and H each are at a low level, the write timing into the memory 10 is set, whereby data a to h of address 0 at the memory 13 is written in address 1 at the memory 10 as shown.

Then, the data of address N at the memory 13 is written in address N+1 at the memory 10.

Next, in a case where the read/write unit reads data from the IC card, the power supply from the read/write unit to the IC card is quite the same as the aforesaid power supply when the IC card writes data from the read/write unit, so that description of the above is omitted herewith.

At first, a write signal X of read/write unit to the memory 13 is always at a low level and kept WRITE ENABLE. Hence, when a signal P is at a low level, the data is adapted to be written in the memory 13.

In this case, the mode switching circuit 27 switches the reset mode to the read command mode (wave from Q') on the basis of the shift clock signal O) sent from the timing circuit 14 and parallel-serial-converts the signal into the series signal R' to be sent toward the coil IV.

On the other hand, the mode switching circuit 28 receives a mode C' from the coil IV and the shift clock signal E from the timing circuit 20 so as to latch the mode C' within the circuit and convert it into a mode D'. The mode switching circuit 28 converts therein the mode D' to E and the mode E further to a mode F' and lastly, sends a memory read signal H' to the memory 10, the timing circuit 20 assigning to the memory 10 address L' to be read. The memory 10 sends to a parallel/serial conversion circuit 24 through the input/output switching circuit the data Y as the parallel signal, the data Y being stored in the address L' on the basis of the memory read signal H'.

The parallel/serial conversion circuit 24 converts therein the parallel data Y into the series data Z, which is sent as data Z' to the coil II.

The coil II' receives the data Z' as a current V and sends it to a serial/parallel conversion circuit 26, which sends parallel data W to the memory 13 through the input/output switching circuit, the memory 13, receiving address U' from the timing circuit 14 to write it in the parallel data W.

A write signal X as above-mentioned is kept always in condition of WRITE ENABLE, whereby the data W is actually written in the memory 13 when the signal P becomes a low level.

As seen from the above, the write-read method of the invention disposes between the storage substrate and the read-write unit four coils in condition of non-contact to thereby send or receive the power supply and signals. Hence, there is no fear that trouble occurs at the contact as conventional so as to cause poor conductivity to thereby make it impossible to transmit or receive the signal. As a result, power supply and signal transfer can be extremely high in reliability.

While an embodiment of the invention has been shown and described, the invention is not limited to the specific construction thereof, which is merely exemplary in the specification rather than defined.

What is claimed is:

1. A system for transferring data between a read/write unit (R/W) and a storage substrate, which comprises:

an IC card composing said storage substrate formed of an insulating material and having four coils therein positioned to be coupled electromagnetically with coils in the R/W unit and electronic circuits embedded therein, said coils comprising a first coil, a second coil, a third coil and a fourth coil, and said electronic circuits comprising a rectifier circuit, a serial/parallel (S/P) convertor, a parallel/serial (P/S) convertor, and input/output (I/O) conversion circuit, a memory, a timing circuit, a mode switching circuit and a chopper circuit;

said IC card first coil being arranged to couple with a first coil of the R/W unit to receive alternating current power from the R/W unit in order to drive the IC card electronic circuits except for the rectifier;

said IC card second coil being arranged to couple with a second coil of the R/W unit to serially output data stored in the IC card memory to the R/W unit;

said IC card third coil being arranged to couple with a third coil of the R/W unit to receive serial data from the R/W unit to be stored in the IC card memory;

said IC card fourth coil being arranged to couple with a fourth coil of the R/W unit to receive mode commands from the R/W unit in order to sequentially switch operations of the I/C card;

said rectifier circuit being connected to rectify power from the IC card first coil and to supply rectified power to the other electronic circuits of the IC card;

serial data received at the IC card third coil from the R/W unit being converted to parallel form by the S/P convertor and written in the IC card memory, via the I/O conversion circuit;

data written in the IC card memory being converted under control of the I/O conversion circuit and chopper circuit to serial data by the P/S convertor and output to the R/W second coil by the IC card second coil;

said mode commands received at the IC card fourth coil being sent to the IC card memory by the mode switching circuit to set timings for write-in memory and read-out memory of the data;

said timing circuit being connected to receive clock signals from the rectifier and convert them to shift clock signals which are supplied to the IC card S/P convertor, P/S convertor and mode switching circuit, and also supplied to select addresses in the IC card memory for the data to be written-in and read-out;

the read/write unit (R/W) being connected to a computer and comprising a card holder for insertion of said IC card, and also comprising said R/W first coil, R/W second coil, R/W third coil and R/W fourth coil which are respectively positioned to be magnetically connected to said IC coils upon insertion of the IC card, and further comprising electronic circuits;

said electronic circuits of the R/W unit comprising an oscillator, a coil driving circuit, a timing circuit, a memory, and input/output (I/O) conversion circuit, a parallel/serial (P/S) convertor, a serial/parallel (S/P) convertor, an interface and a mode switching circuit;

said oscillator being caused to oscillate by application of DC power supplied from said computer outside the R/W unit, said oscillation being amplified by the coil driving circuit and coupled to the R/W first coil;

said interface being connected to send data read-out signals to the R/W memory and to send mode commands to the mode switching circuits;

said R/W memory upon read-out sending parallel data stored therein to the P/S convertor via the I/O convertor, serially converted data from the P/S convertor being applied to the R/W third coil;

said serial data received by the R/W second coil from the I/C second coil being converted to parallel data by the R/W S/P convertor and written into the R/W memory via the I/O convertor;

said R/W timing circuit receiving clock signals from the oscillator in the form of interruptions of the oscillator signal and converting them to shift clock signals, which are supplied to the P/S convertor, S/P convertor and mode switching circuit in the R/W unit;

said R/W mode switching circuit, in response to the shift clock signals, converting mode commands and sending them to the R/W fourth coil; and said R/W timing circuit selecting addresses in the R/W memory for the data to be read out of and written into.

2. A system as recited in claim 1, wherein each of said IC card coils consists of only a coiled electrical conductor embedded in said insulating material.

3. A system as recited in claim 2, wherein said coil holder is of a U-like shape in section forming a pair of parallel plate members, and each said coil of said read/write unit consists of two portions, a portion of each coil being embedded in each of said parallel plate members.

4. A system as recited in claim 3, wherein said IC card coils and said coil holder coil portions are each spirally wound in a plane.

* * * * *